(12) United States Patent
Ferreira

(10) Patent No.: US 11,700,831 B2
(45) Date of Patent: Jul. 18, 2023

(54) APPARATUS AND METHOD FOR PET WASTE DISPOSAL

(71) Applicant: Jaime M Ferreira, Cooper City, FL (US)

(72) Inventor: Jaime M Ferreira, Cooper City, FL (US)

( * ) Notice: Subject to any disclaimer, the term of this patent is extended or adjusted under 35 U.S.C. 154(b) by 398 days.

(21) Appl. No.: 16/835,918

(22) Filed: Mar. 31, 2020

(65) Prior Publication Data

US 2021/0298265 A1 Sep. 30, 2021

(51) Int. Cl.
*A01K 1/01* (2006.01)
*E03F 1/00* (2006.01)

(52) U.S. Cl.
CPC . *A01K 1/01* (2013.01); *E03F 1/00* (2013.01)

(58) Field of Classification Search
CPC ....................................................... A01K 1/01
See application file for complete search history.

(56) References Cited

U.S. PATENT DOCUMENTS

| | | | | |
|---|---|---|---|---|
| 4,555,132 A * | 11/1985 | Takoushian | .......... | A01K 23/005 294/1.5 |
| 6,590,146 B1 * | 7/2003 | Mrsny | ..................... | B65F 1/141 4/300 |
| 8,640,273 B1 * | 2/2014 | Condurso | ................ | A01K 1/01 4/449 |
| 2011/0283949 A1 * | 11/2011 | Kelly | ..................... | A01K 1/011 119/161 |
| 2016/0219836 A1 * | 8/2016 | Fernandez | ............... | A01K 1/01 |
| 2017/0174428 A1 * | 6/2017 | Muir | ........................ | A01K 1/01 |

* cited by examiner

*Primary Examiner* — Kevin F Murphy
(74) *Attorney, Agent, or Firm* — Dunlap Bennett & Ludwig, PLLC

(57) ABSTRACT

A pet waste disposal apparatus and method provides a convenient, safe, and odor free way of disposing of pet waste. The pet waste disposal apparatus includes an upright pipe interconnected with a sewer drain line. A hose coupling interconnects with a water source to rinse the pet waste into the sewer drain line. A lid is movably coupled to a top end of the upright pipe to contain odors.

11 Claims, 3 Drawing Sheets

APPARATUS AND METHOD FOR PET WASTE DISPOSAL

BACKGROUND OF THE INVENTION

The present invention relates to waste disposal and, more particularly, to pet wasted disposal.

For pet owners, it can be inconvenient to dispose of their pet's excrement. If it is allowed to remain where their pet has relieved themselves, it can leave unsightly spots on the lawn, can attract flies, emit undesirable odors, and present the danger of being stepped on.

While various shovel type scoopers have been devised for picking up the waste the pet owner must still dispose of the waste. Likewise, plastic bags may also be used for picking up and disposing of the waste. While these allow the pet owner to readily dispose of the waste, the use of plastic bags can be harmful to the environment when allowed to accumulate in landfills.

As can be seen, there is a need for improved apparatus and methods for the disposal of pet waste.

SUMMARY OF THE INVENTION

In one aspect of the present invention, a pet waste disposal apparatus is disclosed. The pet waste disposal apparatus includes an elongate pipe having and at least one sidewall, a top orifice, a bottom orifice. An interior cavity extends between the top orifice and the bottom orifice. A water inlet aperture extends through the at least one sidewall proximal to the top orifice. A water inlet coupling is attached to the water inlet aperture and is configured to receive a connection to a source of water.

In some embodiments, the pet waste disposal apparatus includes a lid attached to the elongate pipe. The lid operable to selectively open and close access to the top orifice. A hinge attachment may be provided between the lid and the elongate pipe. A spring may be provided to bias the lid in a closed position over the top orifice.

In some embodiments, a coupling is attached at a bottom end of the elongate pipe and is configured to interconnect the elongate pipe with a sewer drain.

In some embodiments, the connection to a source of water is a garden hose.

In other aspects of the invention, a method of disposing of a pet waste is disclosed. The method includes coupling a pet waste disposal apparatus to a sewer drain line. The pet waste disposal apparatus has an elongate pipe having at least one sidewall and a top orifice positioned at an elevated position relative to a ground surface. A connection to a source of water is attached to a water inlet coupling to selectively carry water through a water inlet aperture extending through the at least one sidewall proximal to the top orifice.

The method may also include selectively opening a lid positioned to cover the top orifice. The method also includes depositing the pet waste into the pet waste disposal apparatus through the top orifice when the lid is in an open condition.

In other embodiments, the method includes operating the water inlet coupling to impart a flow of water into the pet waste disposal apparatus. The lid is preferably closed before imparting the flow of water. The flow of water may then be terminated.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved apparatus and method for the disposal of pet waste.

Figure 1:
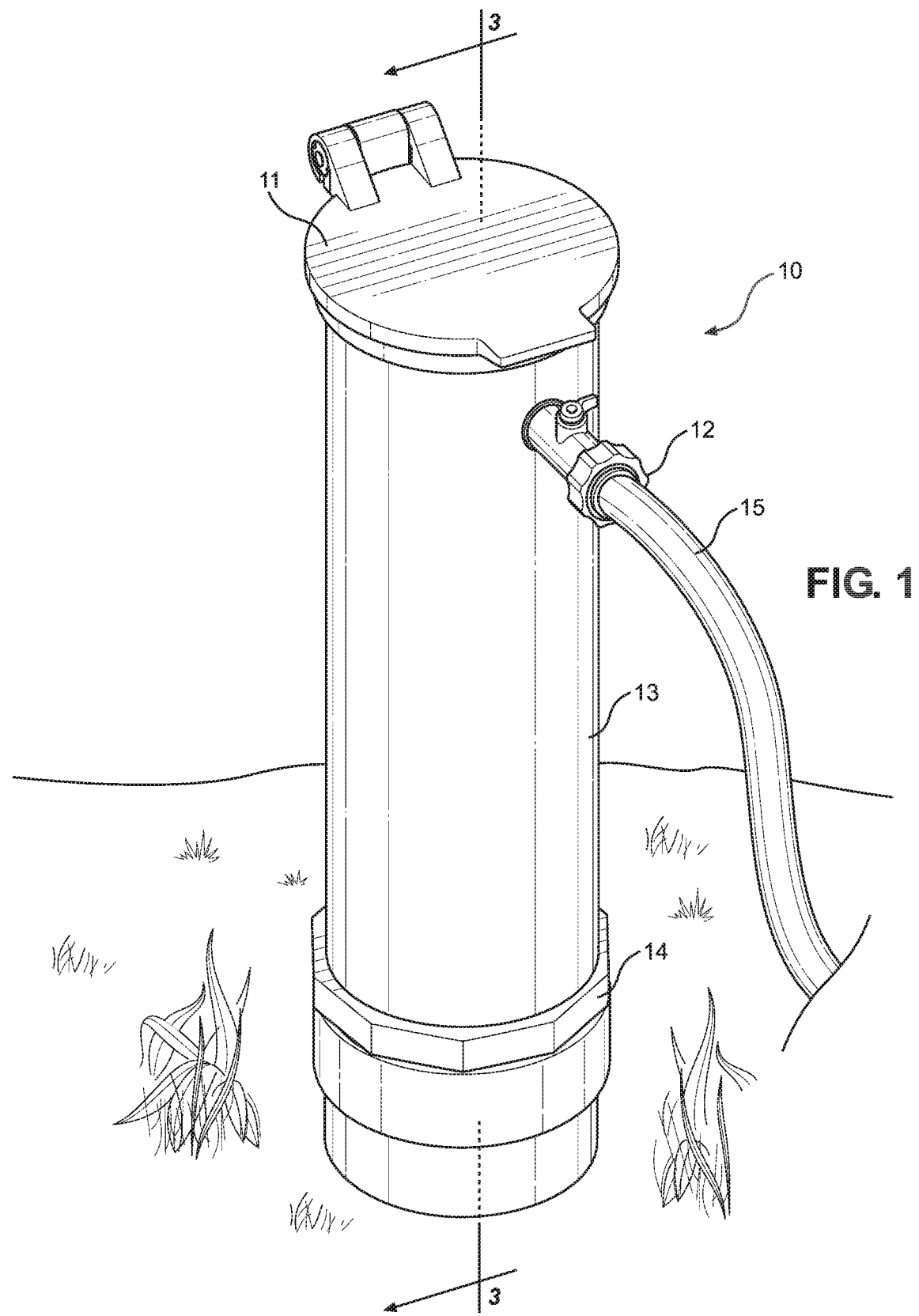
FIG. 1 is a in use view of the pet waste disposal apparatus.
Figure 2:
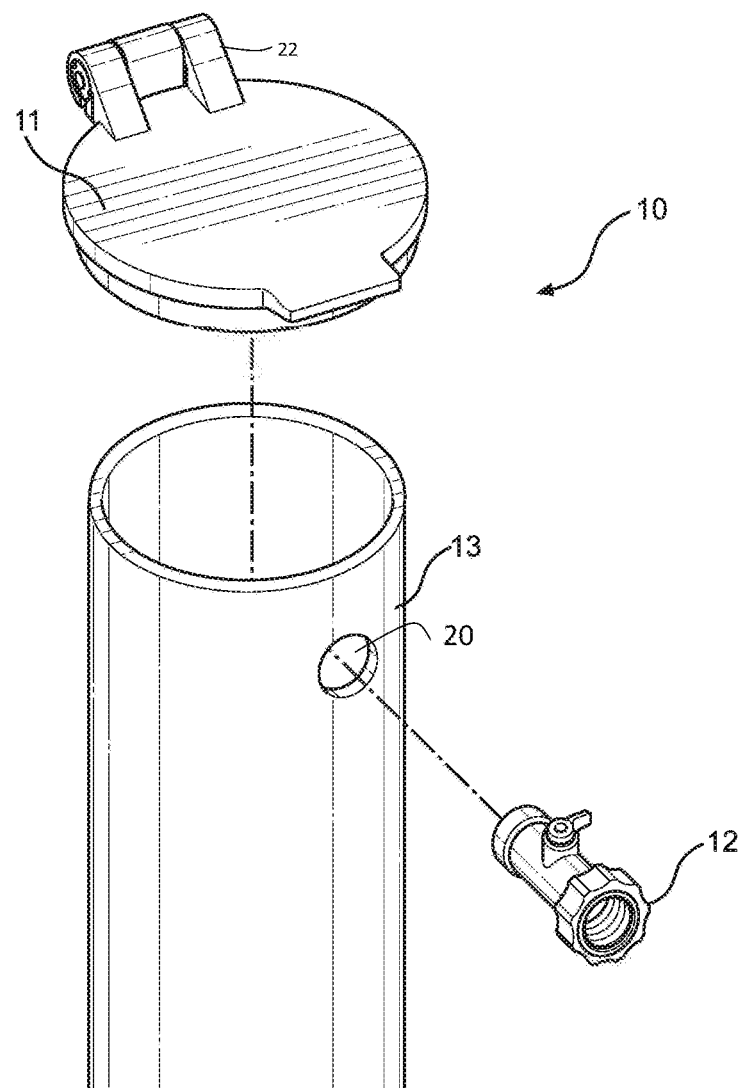
FIG. 2 is a exploded view of the pet waste disposal apparatus.
Figure 3:
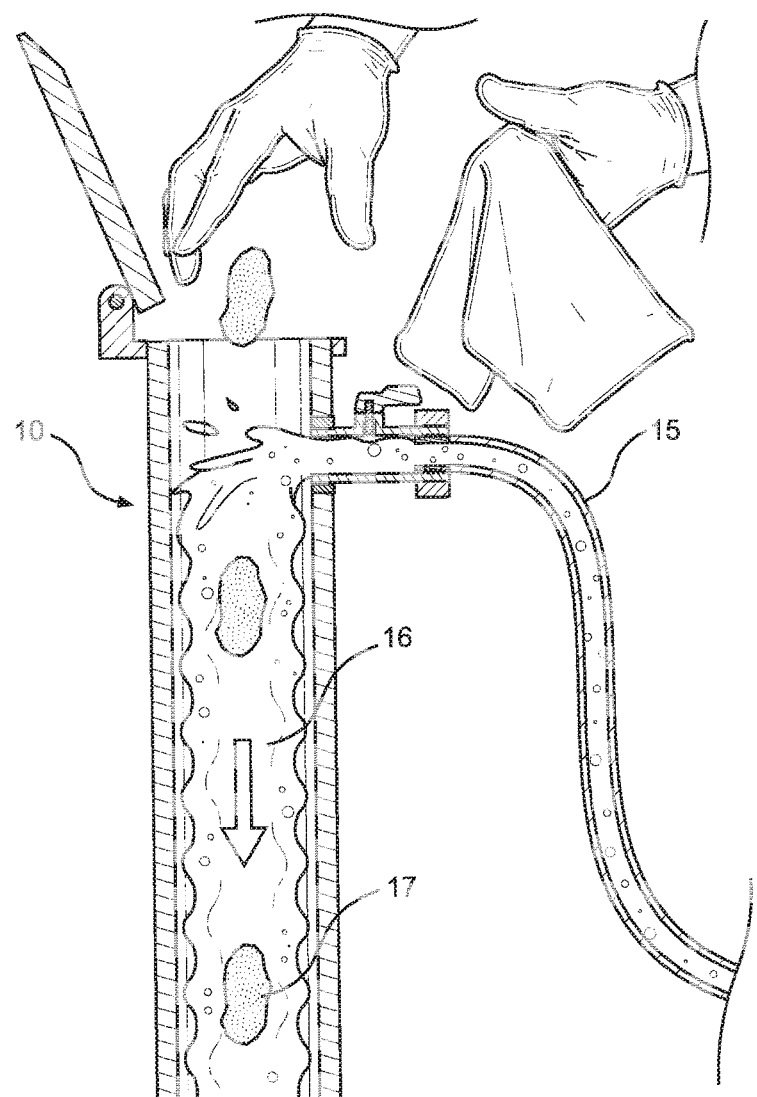
FIG. 3 is a cross section of the pet waste disposal apparatus taken along line 3-3 of FIG. 1, shown in use.

A non-limiting embodiment of a pet waste disposal apparatus 10 of the present invention are illustrated in reference to FIGS. 1-3. The pet waste disposal apparatus 10 includes an elongate cylindrical pipe 13, such as a PVC pipe, that is operatively connected via a coupling 14 to a sewer drain pipe 18 in communication with a sewage treatment system. By way of non-limiting example, in the case of a home or dwelling, the sewer drain pipe 18 may be equipped with an outdoor service access coupling so that the sewer drain pipe 18 may be accessed in the event of a clog within the sewer drain pipe 18 or the extension of the sewer drain pipe into the dwelling. The length of the elongate cylindrical pipe 13 is selected to place the top orifice at an elevated position above the ground so that the pet owner can readily deposit the pet waste 17 without the need to bend over.

A top orifice of the elongate cylindrical pipe 13 is fitted with a lid 11 which may be coupled to the pipe via a hinge 22. The lid 11 may have a tab or handle for selectively opening and closing a top orifice. The hinge 22 may be spring biased to retain the lid 11 in a closed condition on top orifice.

A water inlet aperture 20 extends through a sidewall of the elongate cylindrical pipe 13, proximal to the top orifice. A water inlet coupling 12 is attached to the water inlet aperture 20. The water inlet coupling 12 is configured to receive a connection to a water source 15. By way of non-limiting example, the connection to a water source 15 may be provided by a garden hose 15, coupled to a spigot of the home or dwelling. The water inlet coupling 12 may include a valve to selectively open and close flow of the water through the connection to the water source 15.

In use, the pet owner would retrieve the pet waste 17 from their yard. The pet owner would open the lid 11 and deposit the pet waste 17 through the top orifice. The valve of the water inlet coupling 12 may be opened to permit the flow of water 16 through the water inlet aperture 20 so that water 16 may carry the pet waste 17 into the sewer drain pipe 18. The pet owner may then shutoff the flow of water 16 at the valve of the water inlet coupling 12. Preferably the lid 11 is closed before opening the flow of water 16 to avoid water 16 and pet waste 17 from being emitted from the top orifice.

As will be appreciated, the pet waste disposal apparatus 10 of the present invention may also be employed in other areas beyond a home or dwelling. The pet waste disposal apparatus 10 may also be deployed at parks and other recreation areas where a pet owner would take their pet.

It should be understood, of course, that the foregoing relates to exemplary embodiments of the invention and that modifications may be made without departing from the spirit and scope of the invention as set forth in the following claims.

What is claimed is:

1. A pet waste disposal apparatus, comprising:
an upright elongated pipe having and at least one sidewall, a top orifice, a bottom orifice, and an interior cavity having a consistent, continuous cylindrical shape extending between the top orifice and a bottom shoulder portion, wherein a threaded portion directly interconnects the bottom shoulder portion and the bottom orifice;
a water inlet aperture extending through the at least one sidewall proximal to the top orifice;
a water inlet coupling directly attached to the water inlet aperture so that, when coupled to the water inlet coupling, a source of water is oriented perpendicular the sidewall, wherein the water inlet coupling has a valve to selectively control a flow of water from the source of water so that the flow of water flows perpendicular relative the upright elongated pipe so as to rinse an interior of said at least one sidewall, wherein the valve is physically disposed between the water inlet aperture and the source of water;
a lid attached to the top orifice of the upright elongated pipe, the lid operable to selectively open and close access to the top orifice; and
a hinge attachment between the lid and the elongated pipe, wherein the hinge includes a spring biasing the hinge to urge the lid in a closed position over the top orifice.

2. The pet waste disposal apparatus of claim 1, further comprising:
a coupler at a bottom end of the elongated pipe configured to interconnect the upright elongated pipe with a sewer drain.

3. The pet waste disposal apparatus of claim 1, wherein the source of water is a garden hose.

4. A method of disposing of a pet waste, comprising:
perpendicularly coupling a pet waste disposal apparatus directly to a sewer drain line by way of a threaded bottom portion of the pet waste disposal apparatus, the pet waste disposal apparatus having an upright elongated pipe having at least one sidewall and a top orifice positioned at an elevated position relative to a ground surface so that the upright elongated pipe is oriented perpendicular relative to the ground surface, wherein the at least one sidewall defines an interior cavity having a consistent, continuous cylindrical shape extending between the top orifice and a bottom shoulder, wherein the threaded bottom portion directly interconnects the bottom shoulder and a bottom orifice; and
attaching a connection to a source of water to a water inlet coupling to selectively carry water perpendicularly through a water inlet aperture extending through the at least one sidewall proximal to the top orifice, wherein the water inlet coupling has a valve to selectively control a flow of water from the source of water so that the flow of water flows perpendicular relative the upright elongated pipe so as to rinse an interior of said at least one sidewall; and
hingedly attaching a lid to cover the top orifice of the elongated pipe via a hinge attachment.

5. The method of claim 4, further comprising:
selectively opening the lid covering the top orifice.

6. The method of claim 5, further comprising:
depositing the pet waste into the pet waste disposal apparatus through the top orifice when the lid is in an open condition.

7. The method of claim 6, further comprising:
allowing the lid to be urged to a closed position by way of the hinge attachment between the lid and the upright elongated pipe, wherein the hinge attachment includes a spring biasing the hinge attachment to urge the lid in the closed position over the top orifice.

8. The method of claim 7, further comprising:
operating the water inlet coupling to impart a flow of water into the pet waste disposal apparatus.

9. The method of claim 8, further comprising:
terminating the flow of water.

10. The method of claim 9, further comprising:
selectively operating the flow of water via the valve so that the flow of water rinses the interior of said at least one sidewall,
whereby residuals of the pet waste are rinsed way so as to avoid emission of undesirable odors.

11. The method of claim 10, selecting the sewer drain line that is in communication with a sewage treatment system.

* * * * *